May 13, 1930. L. C. EMMERICH 1,757,994
MOLD FOR VULCANIZING FLANGES ON PIPE ENDS
Filed April 23, 1928
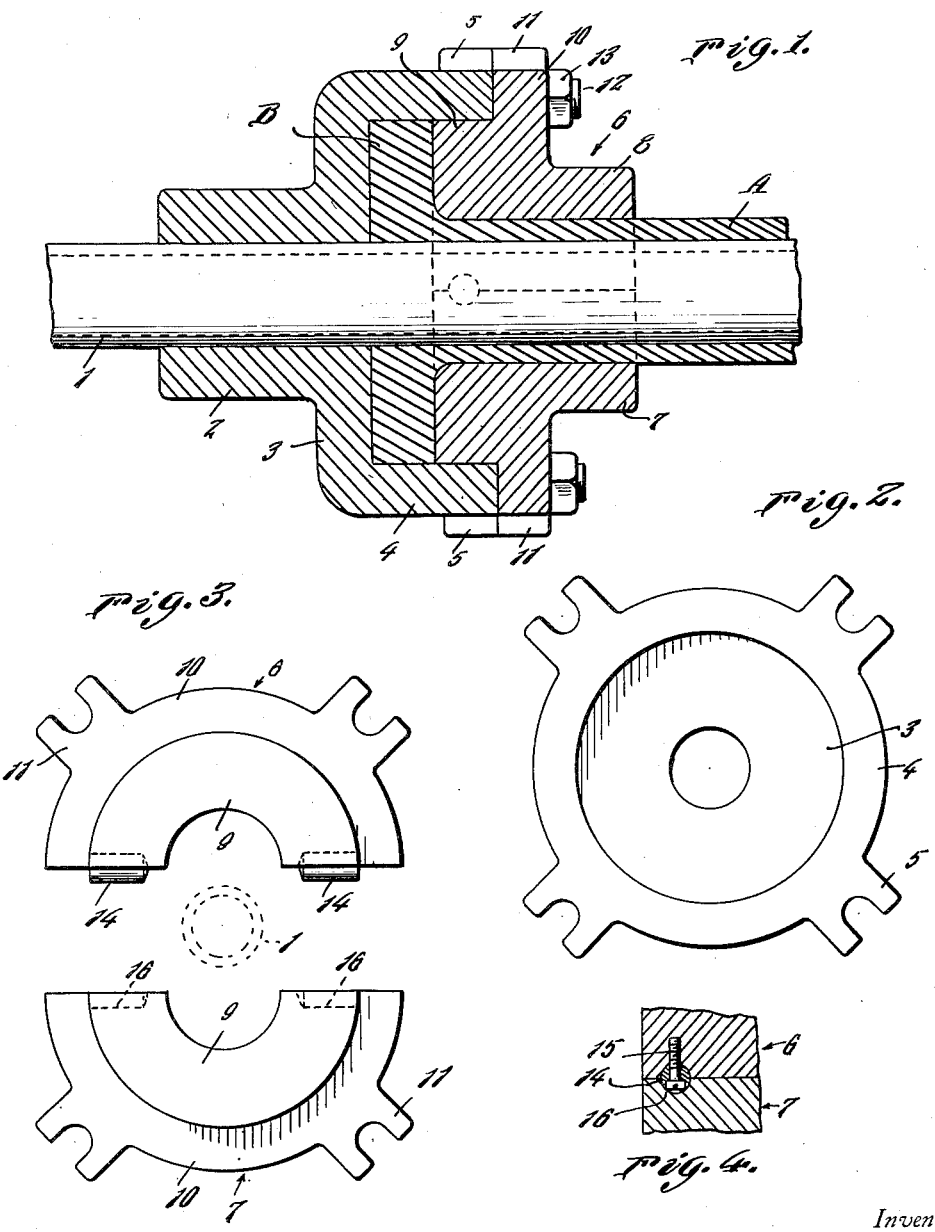
Inventor
L. C. Emmerich
By Clarence A. O'Brien
Attorney Patented May 13, 1930

1,757,994

UNITED STATES PATENT OFFICE

LOUIS C. EMMERICH, OF NEW YORK, N. Y.

MOLD FOR VULCANIZING FLANGES ON PIPE ENDS

Application filed April 23, 1928. Serial No. 272,258.

The present invention relates to improvements in molding devices, and has reference more particularly to a mold for use in vulcanizing a rubber flange on the end of a rubber pipe.

One of the important objects of the present invention is to provide a mold which includes co-acting male and female units, the female unit being adapted for disposition on a mandrel upon which the rubber pipe is placed for treatment, said female unit being further adapted to entirely encase the rubber flange that is to be vulcanized to the end of the rubber pipe, the male unit including a pair of complementary sections for disposition around the end portion of the rubber pipe, and suitable means is provided for securing the units together to effect the proper uniting of the flange on the end of the rubber pipe.

A further object of the invention is to provide a mold of the above mentioned character, which is simple in construction, inexpensive, strong and durable, and further well adapted to the purpose for which it is designed.

Other objects and advantages of the invention will become apparent during the course of the following detailed description taken in connection with the accompanying drawings, forming a part of this application, and in which:

Figure 1 is a longitudinal sectional view through the mold embodying my invention, showing the manner in which the same is assembled, and further illustrating the use of the mold in vulcanizing a flange on the end of the rubber pipe.

Figure 2 is an inside face view of the female section or unit.

Figure 3 is a disassembled inside face view of the complementary sections of the male unit, and Figure 4 is a fragmentary sectional view, showing the keying means between the adjacent edges of the sections of the male unit.

In the drawing, wherein for the purpose of illustration is shown the preferred embodiment of my invention, the numeral 1 designates a portion of an elongated hollow mandrel, on which is arranged one end portion of the rubber hose or pipe A, and on the end of which a rubber flange B is to be vulcanized, in the manner to be presently described.

My improved mold comprises the cooperating male and female sections of units. The female unit includes the sleeve 2, that is adapted for disposition on the mandrel 1 in spaced relation with respect to the end of the rubber hose or pipe A. A relatively large annular flange 3 is formed at the inner end of this sleeve, and an inwardly directed annular flange 4 is formed on the outer edge of the lateral flange 3, for the purpose of providing what may be termed as a cup shaped housing for receiving the rubber flange B.

Extending radially from the outer flanged portion 4 are the notched lugs 5, the purpose of which will be hereinafter more fully described.

The male unit of my mold comprises the complementary upper and lower semi-circular sections designated by the numerals 6 and 7 respectively, in Figure 3. Each semi-circular section comprises an arcuate shaped body 8, the inner end portion of which is enlarged as indicated at 9, and an annular flange 10 is formed on the outer face of each enlarged portion 9 adjacent the outer side thereof for engagement with the free edge of the annular flange 4. The inner end portion of the enlargements 9 formed on the arcuate bodies of the complementary sections of the male units enter the flange receiving housing formed by the flange 3 and the flange 4 of the female units and radially extending lugs 11 are formed on the outer peripheral edge of the flanges 10. These lugs 11 are of identical construction with the lugs 5 and are furthermore adapted to register therewith to receive the securing bolts 12, the heads of the bolts engaging with the outer faces of the apertured or notched lugs 5, and suitable nuts 13 are threaded on the threaded ends of the bolts for engagement with the outer faces of the complementary lugs 10, as clearly shown in Figure 1, and in this manner, the complementary sections of the male unit are upon the rubber hose or pipe A, and against the female unit the inner face of the male unit will be in engagement with the adjacent face of the rubber flange B, while the opposite face of said flange will be in engagement with the bottom face of the housing formed by the flanges 3 and 4 respectively.

For the purpose of securing the sections of the male unit against circumferential movement with respect to each other, I provide a suitable keying means, the same including a pair of cylindrical keys 14 that are secured within suitable recesses provided therefor in the bottom face of the inner end portion of the body of the upper section 6, securing means for these keys being shown at 15, and it is also clearly shown that portions of the keys project beyond the bottom face of the arcuate body.

The adjacent portion of the arcuate body of the lower section 11 is formed in its upper face with the recesses 16 to receive the projecting portions of the cylindrical keys 14 and this feature is shown very clearly in Figures 3 and 4 of the drawings.

In the art of making flanged rubber pipes or tubing, it is necessary to provide some support for the flange on the end of the tube, during the vulcanization step, whereby the flange will be united to the end of the rubber hose. As the vulcanizing of the parts is done by the action of heat, naturally the rubber becomes very soft before chemical action takes place and begins to harden.

It is therefore necessary to provide some means for overcoming this disadvantage, and I have provided a mold which will overcome this disadvantage and when the sections or units of the mold are properly clamped together, there will be a pressure placed upon the rubber flange, and as there is no other escape of the pressure only to the mandrel, the rubber flange and the rubber hose or pipe will be strongly united. Also, there will be no finish required to be placed on the rubber flange as the mold will give the necessary finish. This will save an additional step, as heretofore it has been necessary to finish the faces of the flange by a machine operation, subsequent to the uniting of the flange on the rubber hose.

The simplicity of my improved mold enables the parts to be readily and easily assembled or disassembled and the same will, at all times, be positive and efficient in its operation.

While I have shown the preferred embodiment of my invention, it is to be understood that various changes in the size, shape and arrangement of parts may be resorted to, without departing from the spirit of the invention and the scope of the appended claim.

Having thus described my invention, what I claim as new is:

In a device for vulcanizing a rubber flange on the ends of a rubber pipe, a mandrel, a cup-shaped member having elongated attaching portions closely embracing the mandrel to center the cup-shaped member on the mandrel, a male unit adapted to be closely received in the cup-shaped body and centered thereby, said male unit embodying a pair of separable sections having the opposed portions thereof provided with interfitting means, the outer edge portions of said sections being provided with means engaging the opposed extremity of the cup-shaped body to limit the entrance of the sections into the cup-shaped body, and means to connect said cup-shaped body and said male unit.

In testimony whereof I affix my signature.

LOUIS C. EMMERICH.